United States Patent [19]

Baek

[11] Patent Number: 5,781,618
[45] Date of Patent: Jul. 14, 1998

[54] METHOD FOR TRANSMITTING ABSENCE INFORMATION IN FACSIMILE SYSTEM

[75] Inventor: Nam-Dae Baek, Daegu, Rep. of Korea

[73] Assignee: SamSung Electronics Co., Ltd., Suwon, Rep. of Korea

[21] Appl. No.: 702,292

[22] Filed: Aug. 20, 1996

[30] Foreign Application Priority Data

Aug. 22, 1995 [KR] Rep. of Korea ............ 1995 25988
Mar. 23, 1996 [KR] Rep. of Korea ............ 1996 8073

[51] Int. Cl.$^6$ .................................................. H04M 11/00
[52] U.S. Cl. ...................................................... 379/100.06
[58] Field of Search ...................... 379/100.01, 100.04, 379/100.05, 100.06, 100.15, 100.16, 67, 88, 89, 77

[56] References Cited

U.S. PATENT DOCUMENTS

| | | | |
|---|---|---|---|
| 4,794,639 | 12/1988 | Urui et al. ...................... | 379/89 |
| 4,918,722 | 4/1990 | Duehren et al. . | |
| 4,932,048 | 6/1990 | Kenmochi et al. ............... | 379/100.16 |
| 5,068,888 | 11/1991 | Scherk et al. . | |
| 5,090,049 | 2/1992 | Chen . | |
| 5,341,413 | 8/1994 | Hori et al. . | |
| 5,377,257 | 12/1994 | Shirasaka et al. ............... | 379/100.16 |
| 5,384,830 | 1/1995 | Ide . | |
| 5,384,836 | 1/1995 | Otsuka . | |
| 5,444,771 | 8/1995 | Ohnishi . | |
| 5,454,030 | 9/1995 | de Oliveira et al. . | |
| 5,488,651 | 1/1996 | Giler et al. . | |
| 5,508,824 | 4/1996 | Baba . | |

FOREIGN PATENT DOCUMENTS 2237163  4/1991  United Kingdom .
2297219  7/1996  United Kingdom .

Primary Examiner—Wing F. Chan
Attorney, Agent, or Firm—Robert E. Bushnell, Esq.

[57] ABSTRACT

According to a method for recording and transmitting absence information in a facsimile system, an absence information recording mode is established in response to input of a first predetermined key and the absence information is recorded while the absence information recording mode is established. The absence information includes: a destination, telephone numbers at the destination, an outgoing time and an expected return time. An absence information transmission mode is established in response to input of a second predetermined key and the absence information is transmitted upon receipt of a call signal while the absence information transmission mode is established. The absence information is re-transmitted until reception error information received in response to the transmission of the absence information indicates that a reception error has not occurred. The absence information is replaced with new absence information when the new absence information is received in response to the transmission of the absence information.

20 Claims, 9 Drawing Sheets

---

RECIPIENT ABSENCE INFORMATION LIST

DESTINATION : TAEKU

TELEPHONE NUMBER :

TEL : 460 – 2775

FAX : 460 – 2776

PAGER : 012–723–1234

HHP : 011–711–4321

OUTGOING TIME : 95. 6. 16 AM 10:30

EXPECTED RETURNING TIME : 95. 6. 17 PM 5:30

| NO | Information | |
|---|---|---|
| Ø A | 053 | 512 |
| Ø B | 01 4602775 | 514 |
| | 02 4602776 | |
| | 03 0127231234 | |
| | 04 0117114321 | |
| Ø C | 95 0616 1030 | 516 |
| Ø D | 95 0617 1750 | 518 |

| NSF or NSC | Information |

Fig. 8A

| NSS or NSC | Information |

RECIPIENT ABSENCE INFORMATION LIST

DESTINATION : TAEKU

TELEPHONE NUMBER :
- TEL : 460 − 2775
- FAX : 460 − 2776
- PAGER : 012−723−1234
- HHP : 011−711−4321

OUTGOING TIME : 95. 6. 16  AM 10:30

EXPECTED RETURNING TIME : 95. 6. 17  PM 5:30

Fig. 9

RECIPIENT ABSENCE INFORMATION LIST

DESTINATION : PUSAN

TELEPHONE NUMBER :

TEL : 253 − 4567

FAX : 253 − 4568

PAGER : 012−723−1234

HHP : 011−711−4321

OUTGOING TIME : 95. 6. 16  AM 10:30

EXPECTED  RETURNING TIME : 95. 6. 19 AM 11:00

*Fig. 10*

METHOD FOR TRANSMITTING ABSENCE INFORMATION IN FACSIMILE SYSTEM

CROSS-REFERENCE TO RELATED APPLICATIONS

This application makes reference to, incorporates the same herein, and claims all benefits accruing under 35 U.S.C. §119 arising from applications for Method For Transmitting Absence Information In Facsimile System earlier filed in the Korean Industrial Property Office on 22 Aug. 1995 and 23 Mar. 1996 and there duly assigned Ser. Nos. 25988/1995 and 8073/1996, respectively.

BACKGROUND OF THE INVENTION

The present invention relates to a facsimile system, and more particularly, to a method for transmitting absence information when a call signal for document reception is received by a party's facsimile system during the party's absence.

In general, a facsimile system operates to transmit and receive documents. With the progress of technology, however, facsimile systems have become quite advanced in the types of features that they provide. U.S. Pat. No. 5,444,771 entitled Facsimile Machine Having Answering Function issued to Ohnishi, for example, discloses a facsimile system that provides a call answering function. U.S. Pat. No. 5,384,830 entitled Apparatus With Selective Forwarding Of Facsimile And Voice Communications issued to Ide, on the other hand, discloses a facsimile system that provides a feature for selectively forwarding facsimile and voice communications. While these types of features are clearly useful, I note that the prior art fails to provide a facsimile system capable of recording and transmitting absence information. In other words, when a caller transmits a document by facsimile to an intended recipient during the intended recipient's absence, the caller often fails to receive a timely reply from the recipient, and therefore can be delayed in carrying out business associated with the facsimile transmission. Moreover, the caller is often unable to obtain absence information, such as the recipient's destination, telephone numbers to contact the recipient at the destination, the recipient's outgoing time, and the recipient's expected return time. The present invention is directed towards solving this problem.

SUMMARY OF THE INVENTION

Accordingly, it is an object of the present invention to provide an improved facsimile system.

It is another object to provide a method for recording in a memory of a facsimile system absence information, such as a party's destination, telephone numbers to contact the party at the destination, the party's outgoing time, and the party's expected return time.

It is still another object to provide a method for transmitting absence information when a call signal for document reception is received by a party's facsimile system during the party's absence.

It is yet another object to provide a method for enabling a party to replace existing absence information recorded within the party's facsimile system with new absence information from another facsimile system.

To achieve these and other objects, the present invention provides a method for recording and transmitting absence information in a facsimile system. An absence information recording mode is established in response to input of a first predetermined key and the absence information is recorded while the absence information recording mode is established. The absence information includes: a destination, telephone numbers at the destination, an outgoing time and an expected return time. An absence information transmission mode is established in response to input of a second predetermined key and the absence information is transmitted upon receipt of a call signal while the absence information transmission mode is established. The absence information is re-transmitted until reception error information received in response to the transmission of the absence information indicates that a reception error has not occurred. The absence information is replaced with new absence information when the new absence information is received in response to the transmission of the absence information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
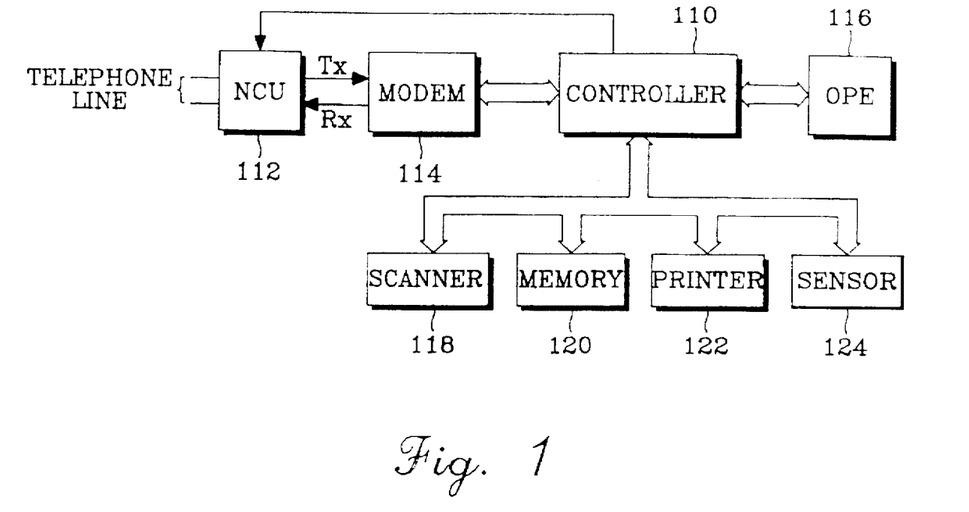
FIG. 1 illustrates a block diagram of a facsimile system constructed according to the principles of the present invention.

Turning now to the drawings and referring to FIG. 1, a block diagram of a facsimile system constructed according to the principles of the present invention is shown. In FIG. 1, a controller 110 controls the overall operation of the facsimile system pursuant to a predetermined program. In particular, controller 110 enables the recording of input absence information as encoded information, and also enables transmission of the recorded absence information. A network control unit (NCU) 112 connects a telephone line to a modem 114, thereby establishing a transmission loop under the control of controller 110. Network control unit (NCU) 112 interfaces signals between modem 114 and the telephone line. Modem 114 converts data into analog-modulated signals under the control of controller 110, and provides the analog-modulated signals for transmission over the telephone line. Modem 114 also demodulates analog-modulated signals received over the telephone line for reproduction. A operating panel (OPE) 116 includes a key pad having a plurality of keys, including an absence information recording key for establishing an absence information recording mode, and aa absence information recording end key for ending the absence information recording mode. Key data generated from operating panel (OPE) 116 is output to controller 110.

A scanner 118 systematically converts the densities of the elemental areas of a document to be transmitted into corresponding binary image signals under the control of controller 110, and provides the image signals to controller 110. A memory 120 includes a read only memory (ROM) for storing a control program pursuant to which controller 110 operates, and a random access memory (RAM) for recording and managing transmitted/received data and absence information as encoded information. A printer 122 prints the image signals under the control of controller 110. A sensor 124 performs error detection in a receiving mode and a receiving standby mode, and provides the results to controller 110.

Figure 2:
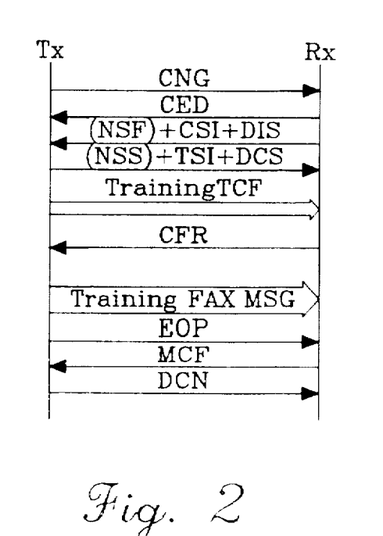
FIG. 2 illustrates a protocol for a facsimile system according to International Telecommunications Union standards.

FIG. 2 illustrates a protocol for a facsimile system according to International Telecommunications Union standards.

The signals employed to perform the protocol of FIG. 2 are as follows: CNG (calling tone), CED (called station identification), NSF (non-standard facilities), NSS (non-standard facilities set-up), NSC (non-standard facilities command), CSI (called subscriber identification), DIS (digital identification signal), TSI (transmitting subscriber identification), DCS (digital command signal), TCF (training check), CFR (confirmation to receive), EOP (end of procedures), MCF (message confirmation), DCN (disconnect). The protocol of FIG. 2 includes non-standard protocol signals, such as the above-mentioned NSF, NSS and NSC that do not need to be transmitted during general communication, and standard protocol signals that are essential for general communication.

The following description relates to the steps of document transmission and reception by receiving and transmitting facsimile systems. In this application, the term "transmitting party" refers to the party that initiates facsimile transmission, and the term "receiving party" refers to the party that is the intended recipient of the document transmitted by the "transmitting party".

In response to reception of the CNG signal, the receiving party's facsimile system transmits the CED signal to the transmitting party's facsimile system. When the TCF signal that inquires about the receiving facsimile system's preparation for document reception is received, the receiving party's facsimile system transmits the CFR signal to the transmitting party's facsimile system to indicate that preparation for document reception is complete. Accordingly, the transmitting facsimile system sends facsimile messages and the EOP signal to the receiving party's facsimile system to indicate message completion.

In response to reception of the EOP signal, the receiving party's facsimile system sends the MCF signal to the transmitting party's facsimile system to confirm normal message reception. In response to reception of the MCF signal, the transmitting party's facsimile system then transmits the DCN signal to the receiving party's facsimile system to disconnect the transmission loop between the two facsimile systems, and thereby finish document transmission. The receiving party's facsimile system disconnects the transmission loop and changes to a standby mode when it receives the DCN signal from the transmitting party's facsimile system.

According to this operation, when the transmitting party sends a document via facsimile during the receiving party's absence, the transmitting party often fails to receive a timely reply from the receiving party and is unable to obtain absence information, such as the receiving party's destination, available telephone numbers at the destination, and the times when the receiving party goes out and is expected to return.

Figure 3A:
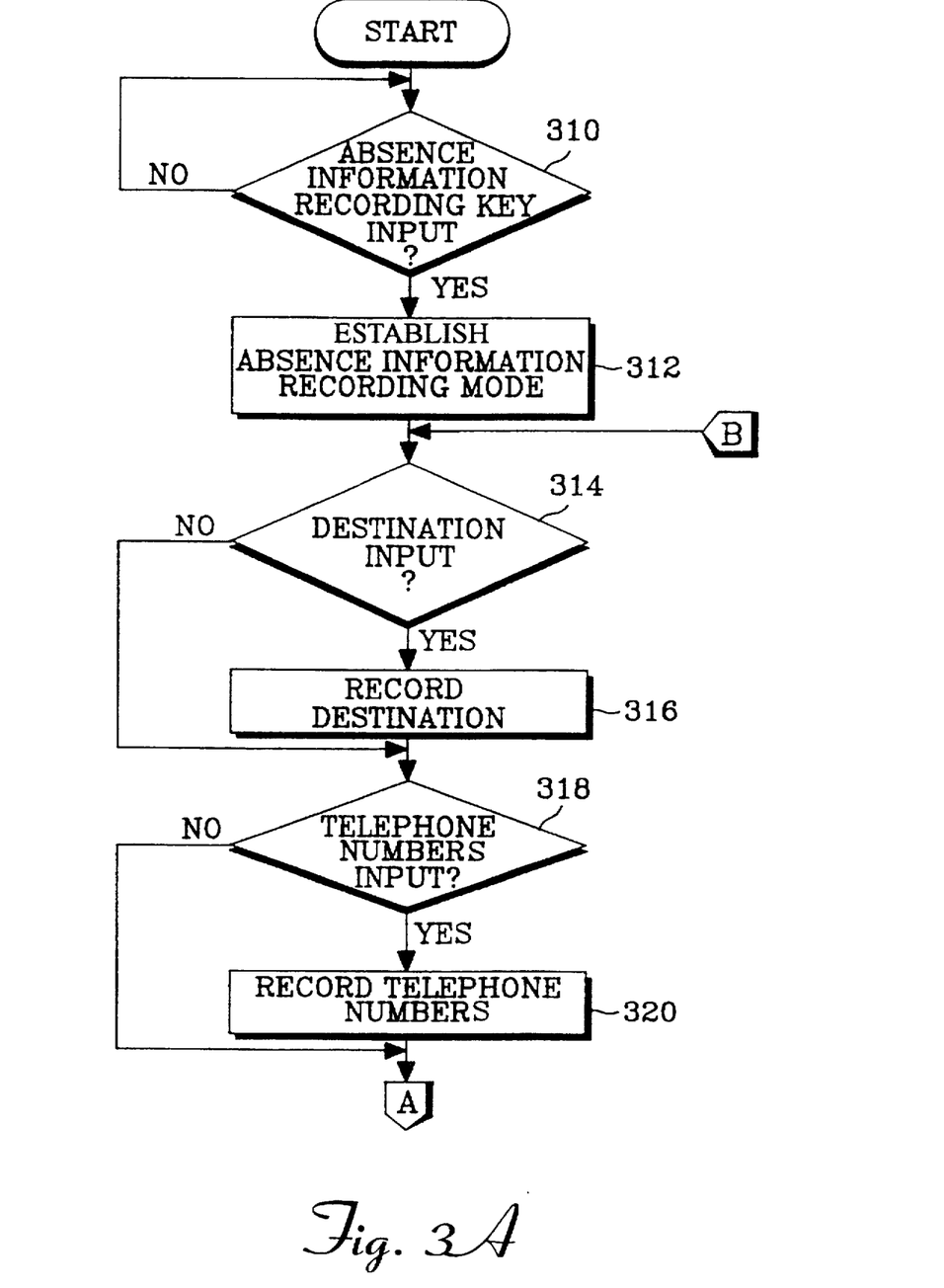
FIGS. 3A and 3B illustrate the steps of recording absence information in accordance with the principles of the present invention.
Figure 3B:
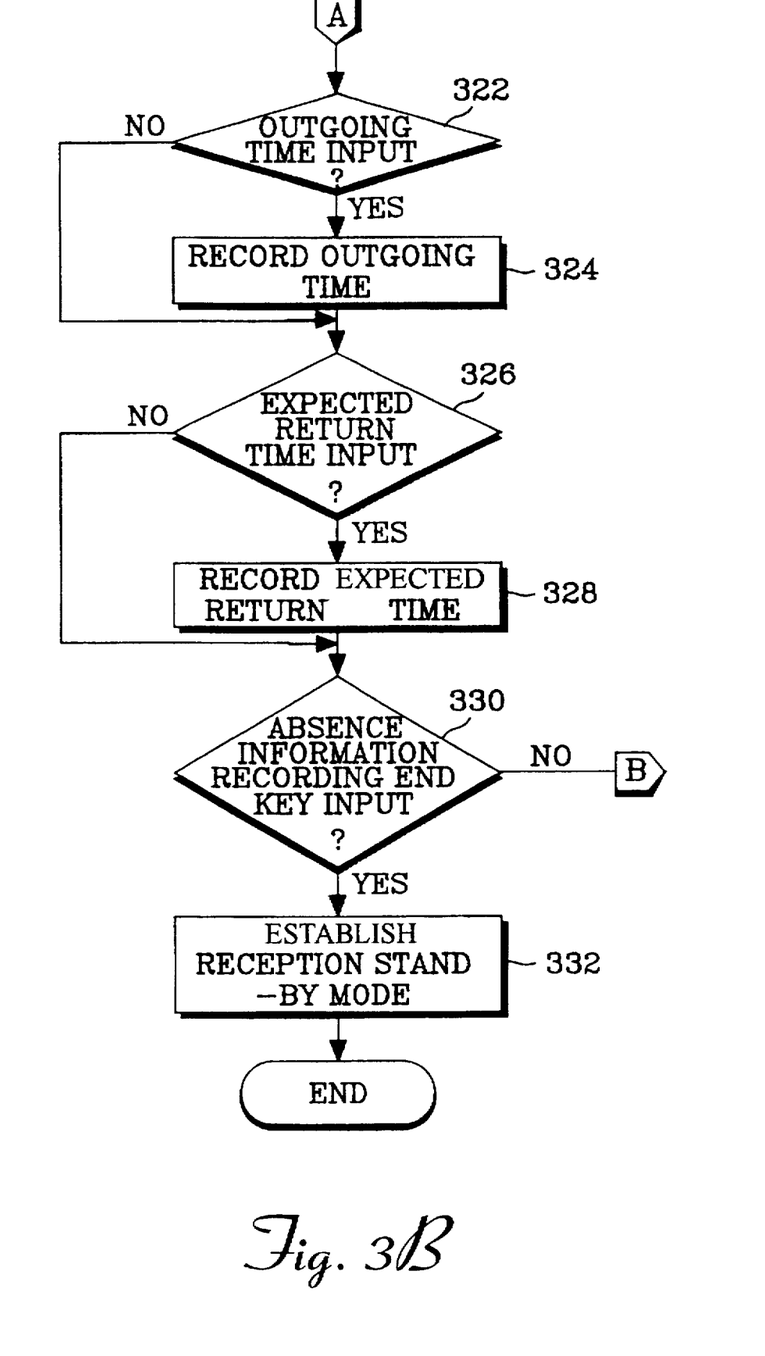

FIGS. 3A and 3B illustrate the steps of recording absence information in accordance with the principles of the present invention. Briefly, these steps include: establishing an absence information recording mode in response to input of an absence information recording key; receiving and recording the absence information (e.g., the party's destination, the available telephone numbers at the destination, the times when the party goes out and is expected to return, etc.) during the absence information recording mode; and switching from the absence information recording mode to a receiving standby mode in response to input of an absence information recording end key.

Figure 4A:
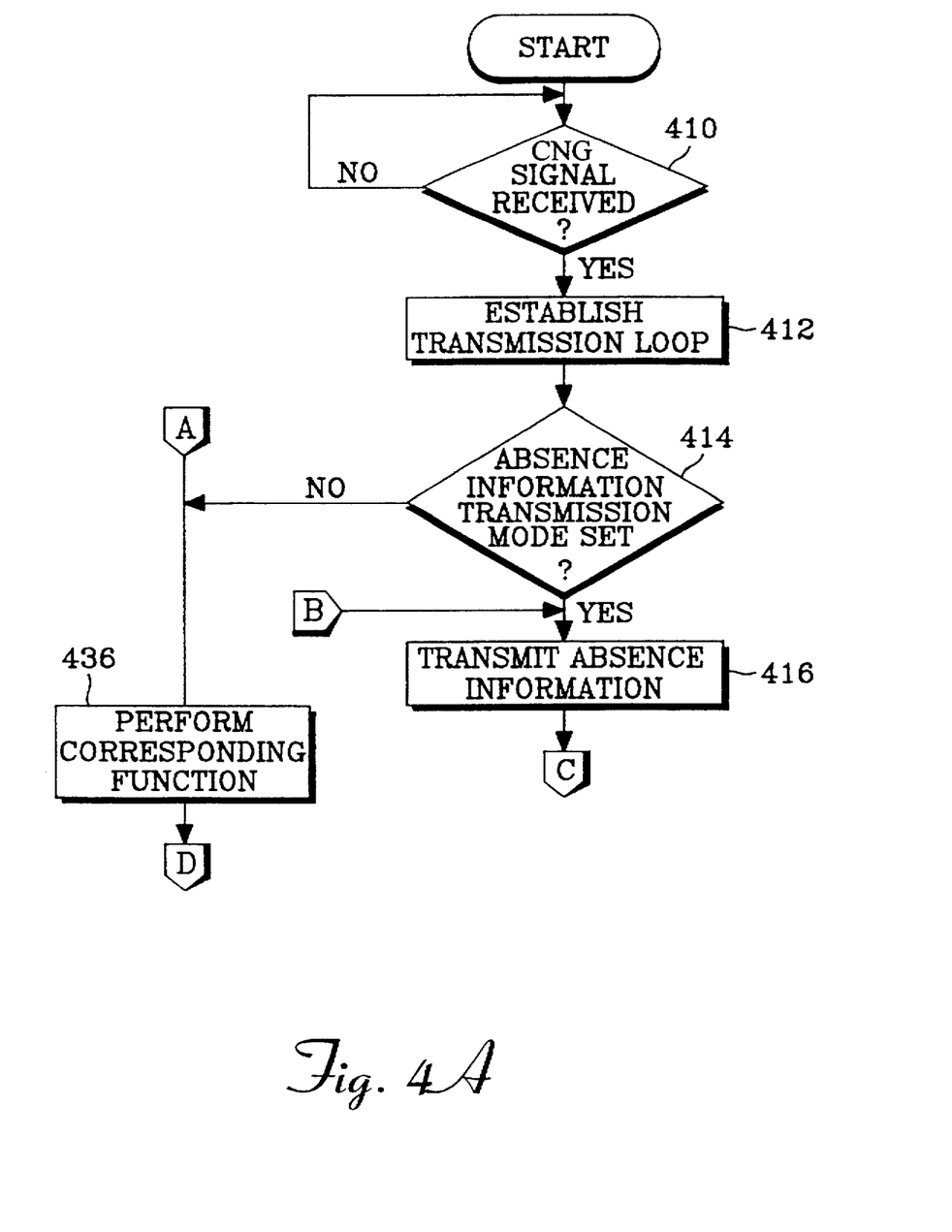
FIGS. 4A and 4B illustrate the steps of transmitting and changing absence information in accordance with the principles of the present invention.
Figure 4B:
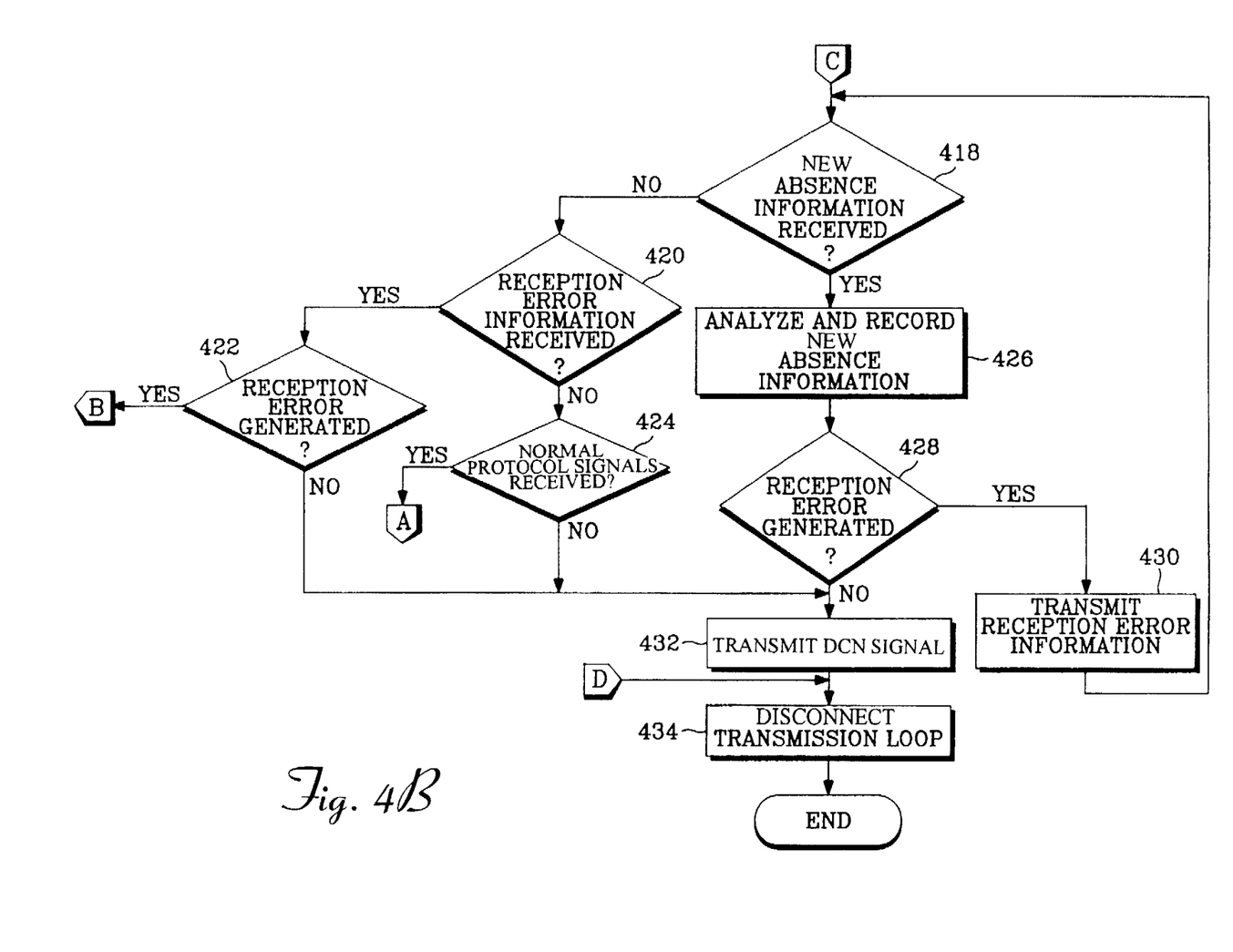

FIGS. 4A and 4B illustrate the steps of transmitting and changing absence information in accordance with the principles of the present invention. Briefly, these steps include: establishing a transmission loop and transmitting the absence information to a transmitting party's facsimile system when a call signal is received and an absence information transmission mode is established at a receiving party's facsimile system; retransmitting the absence information to the transmitting party's facsimile system when a reception error is generated during the transmission of the absence information; and analyzing and recording new absence information received in response to transmission of the absence information. Data is transmitted and received between the facsimile systems via the non-standard protocol signals that are not used in general communication.

Figure 5:
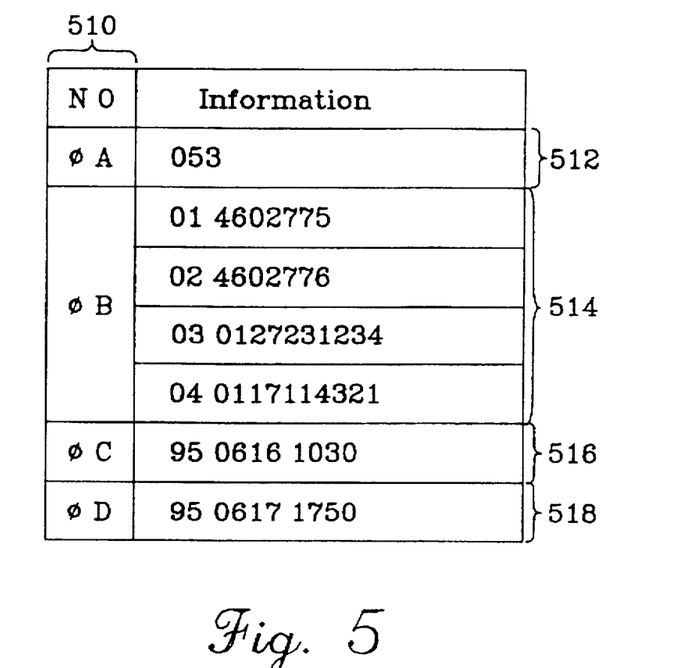
FIG. 5 illustrates a memory map that stores absence information during the steps of FIGS. 3A and 3B.

FIG. 5 illustrates a map of memory 120 that stores absence information during the steps of FIGS. 3A and 3B. In FIG. 5, reference number 510 represents an area used to sort various portions of the absence information. In particular, "φA" is for the party's destination, "φB" is for phone numbers at the party's destination, "φC" is for the time when the party goes out, and "φD" is for the time when the party is expected to return. Reference number 512 represents an area that stores the portion of absence information indicative of the party's destination. This information can be represented by the numbers of the destination's area code. Reference number 514 represents an area that stores the portion of absence information indicative of the phone numbers at the destination. In a preferred embodiment, the party's telephone number at the destination is stored following "01", the party's facsimile number at the destination is stored after "02", the party's pager number at the destination is stored after "03", and the party's cellular telephone number at the destination is stored after "04".

Reference number 516 represents an area that stores the portion of absence information indicative of when the party goes out, and reference number 518 represents an area that stores the portion of absence information indicative of when the party is expected to return. In areas 516 and 518, numbers indicative of the date (year-month-day) and the time (hour-minute) are sequentially arranged to represent the absence information.

Figure 6A:
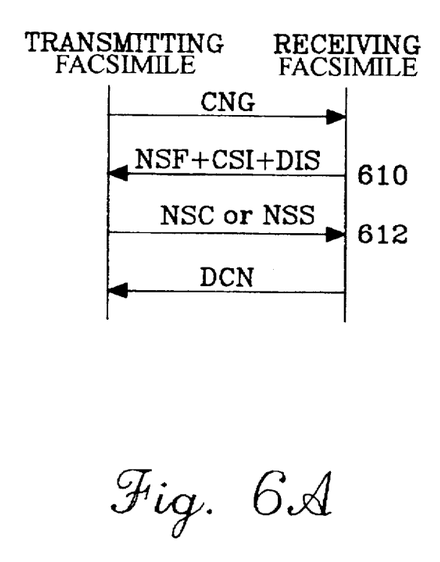
FIGS. 6A and 6B illustrate a protocol for transmitting absence information in the steps of FIGS. 4A and 4B.
Figure 6B:
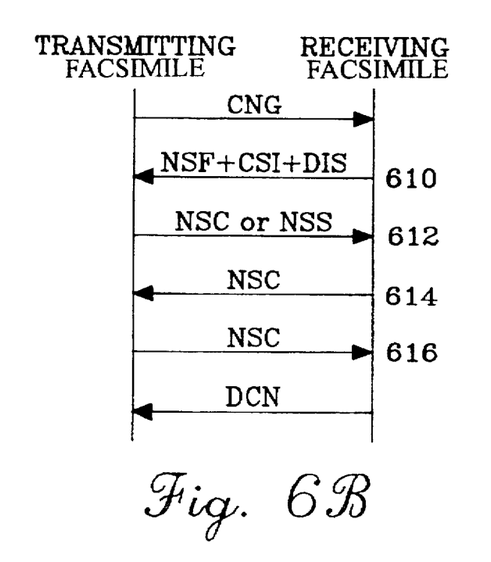

FIGS. 6A and 6B illustrate a protocol for transmitting absence information in the steps of FIGS. 4A and 4B.

FIG. 6A illustrates the protocol performed when the absence information is properly transmitted and received between two facsimile systems. In FIG. 6A, once the CNG signal is received from the transmitting party's facsimile system, the receiving party's facsimile system transmits the recorded absence information through an information area of NSF, along with the CSI and DIS signals of the standard protocol, as indicated by reference number 610. Responsive to this, the transmitting party's facsimile system transmits to the receiving party's facsimile system, either the NSS or NSC signal containing data indicating that the absence information has been properly received, as indicated by reference number 612. The receiving party's facsimile system then transmits the DCN signal to the transmitting party's facsimile system indicating protocol completion.

FIG. 6B illustrates the protocol performed when the absence information is not properly transmitted and received between two facsimile systems. In FIG. 6B, like FIG. 6A, once the CNG signal is received from the transmitting party's facsimile system, the receiving party's facsimile system sends the recorded absence information through an information area of NSF, along with the CSI and DIS signals of the standard protocol, as indicated by reference number 610. Responsive to this, the transmitting party's facsimile system transmits to the receiving party's facsimile system, either the NSS or NSC signal containing data indicating that the absence information has not been properly received, as indicated by reference number 612. In response to reception of the NSC or NSS signal, the receiving party's facsimile system re-transmits the NSC signal having the absence information to the transmitting party's facsimile system, as indicated by reference number 614. Upon proper reception of the absence information, the transmitting party's facsimile system sends the NSC signal to the receiving party's facsimile system indicating proper reception of the correct absence information, as indicated by reference number 616. In response to reception of the NSC signal, the receiving party's facsimile system transmits the DCN signal to the transmitting party's facsimile system indicating protocol completion.

Figure 7A:
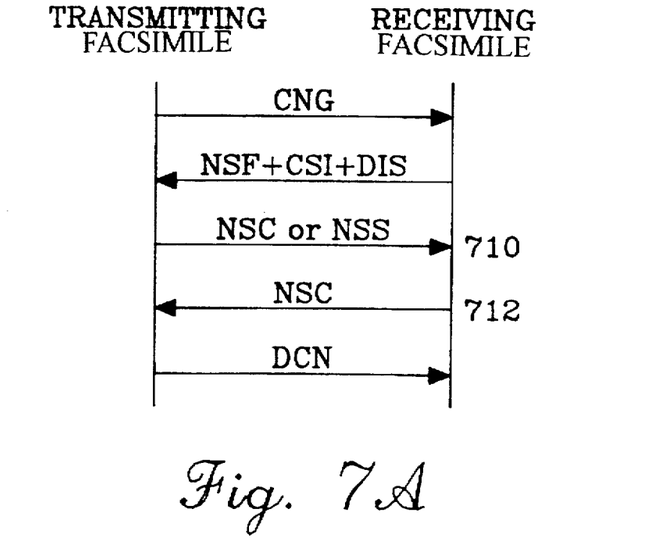
FIGS. 7A and 7B illustrate a protocol for changing absence information that has been previously recorded in the facsimile system.
Figure 7B:
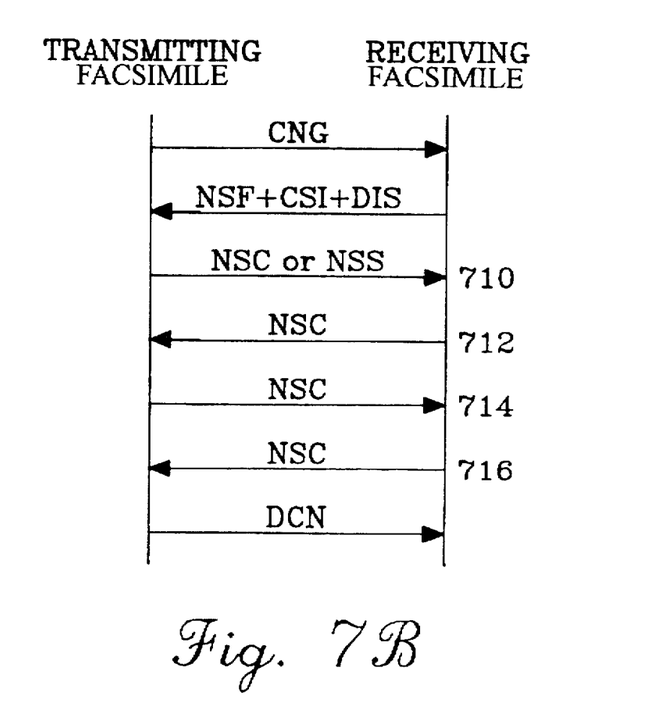

FIGS. 7A and 7B illustrate a protocol for changing absence information that has been previously recorded in the facsimile system.

FIG. 7A illustrates the protocol performed when changed (i.e., new) absence information is properly transmitted and received between two facsimile systems. As shown in FIG. 7A, the receiving party's facsimile system sends the NSF signal having the absence information in its information area along with the standard CSI and DIS protocol signals to the transmitting party's facsimile system, in response to reception of the CNG signal. When the transmitting party's facsimile system sends the NSS or NSC signal carrying the new absence information in its information area to the receiving party's facsimile system, as indicated by reference number 710, the receiving party's facsimile system analyzes the new absence information, and replaces the previously recorded absence information with the new absence information. Subsequently, the receiving party's facsimile system transmits the NSC signal to the transmitting party's facsimile system to report that the new absence information has been properly received, as indicated by reference number 712. Thereafter, the transmitting party's facsimile system transmits the DCN signal to the receiving party's facsimile system, and the protocol is complete.

FIG. 7B illustrates the protocol performed when new absence information is not properly transmitted and received between two facsimile systems. As shown in FIG. 7B, the receiving party's facsimile system sends the NSF signal containing the absence information in its information area along with the standard CSI and DIS protocol signals to the transmitting party's facsimile system, in response to reception of the CNG signal. When the transmitting party's facsimile system sends the NSS or NSC signal carrying the new absence information in its information area to the receiving party's facsimile system, as indicated by reference number 710, the receiving party's facsimile system analyzes the new absence information, and determines whether a reception error is generated. When a reception error is generated, the receiving party's facsimile system sends the NSC signal having data in its information area reporting the occurrence of the reception error, as indicated by reference number 712.

Then, the receiving party's facsimile system again receives the NSC signal carrying the new absence information, as indicated by reference number 714. The receiving party's facsimile system analyzes the new absence information to replace the previously recorded absence information with the new absence information. Subsequently, the receiving party's facsimile system transmits the NSC signal to the transmitting party's facsimile system to report that the new absence information has been properly received, as indicated by reference number 716. Thereafter, the transmitting party's facsimile system transmits the DCN signal to the receiving party's facsimile system, and the protocol is complete.

Figure 8A:
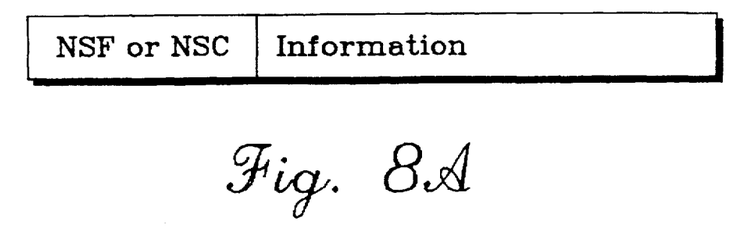
FIGS. 8A and 8B illustrate the structure of frames transmitted during the protocol of FIGS. 6A through 7B.
Figure 8B:
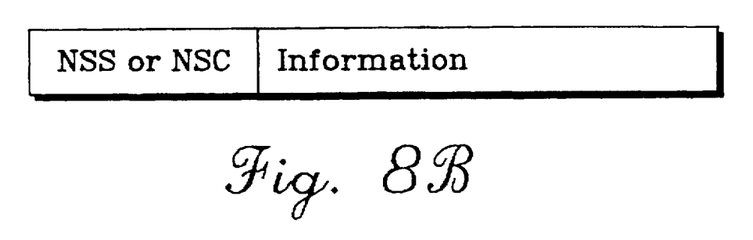

FIGS. 8A and 8B illustrate the structure of frames transmitted during the protocol of FIGS. 6A through 7B. In particular, FIG. 8A shows the frame structure for the NSF or NSC signals transmitted or received as indicated by reference numbers 610 and 616 of FIGS. 6A and 6B, and by reference numbers 710 and 714 of FIGS. 7A and 7B. The NSF or NSC frame includes address and information areas, and the absence information is recorded in the information area.

In addition, FIG. 8B shows a frame structure for the NSS or NSC signals transmitted or received as indicated by reference numbers 612 and 614 of FIGS. 6A and 6B, and by reference numbers 712 and 716 of FIGS. 7A and 7B. The reception error information is recorded in the information area of the NSS or NSC frame.

Figure 9:
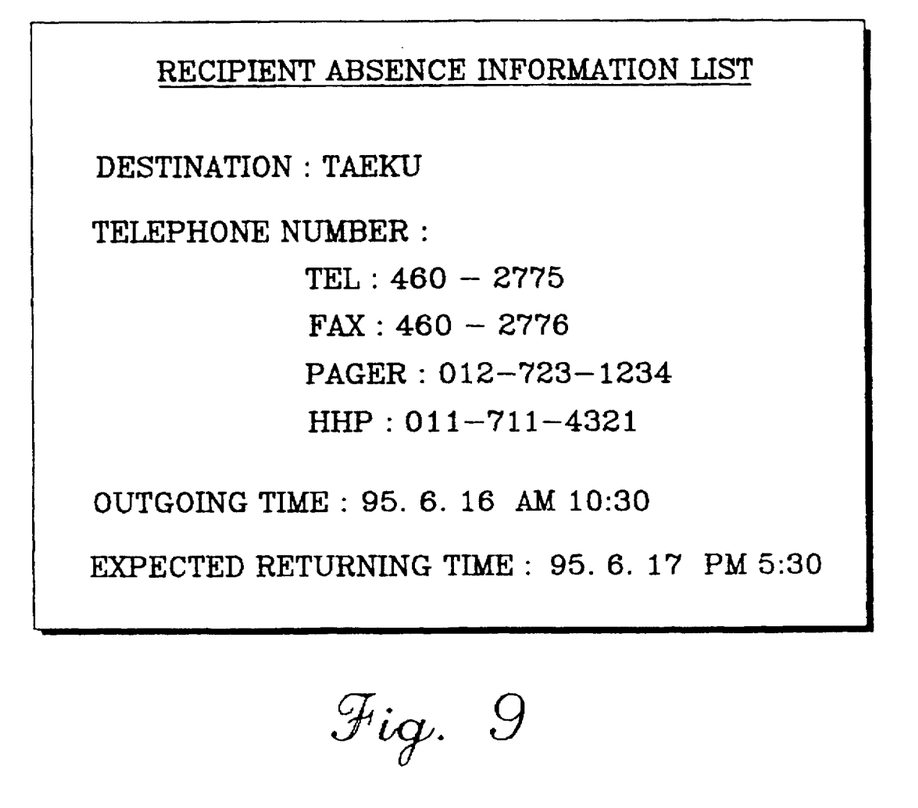
FIG. 9 illustrates an absence information list that is printed at a transmitting party's facsimile system by executing the steps of FIGS. 4A and 4B.
Figure 10:
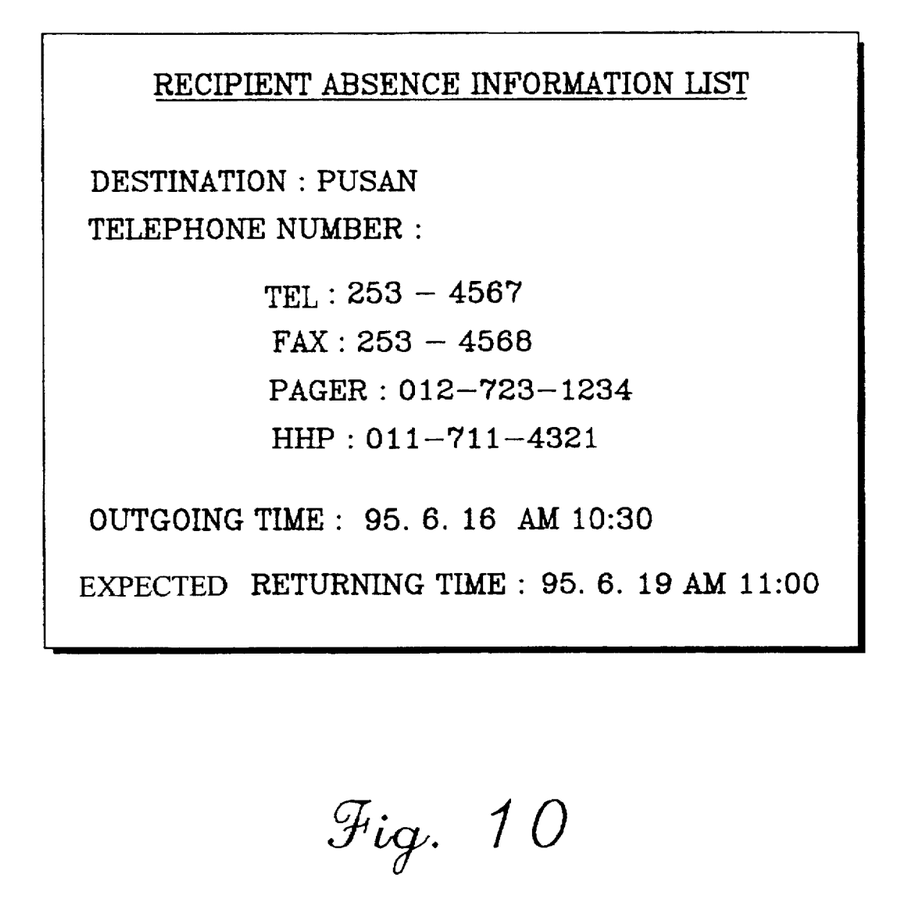
FIG. 10 illustrates a changed absence information list that is printed at a transmitting party's facsimile system by executing the steps of FIGS. 4A and 4B.

FIG. 9 illustrates an absence information list that is printed at a transmitting party's facsimile system by executing the steps of FIGS. 4A and 4B. FIG. 10 illustrates a changed absence information list that is printed at a transmitting party's facsimile system by executing the steps of FIGS. 4A and 4B.

A first preferred embodiment of the present invention will now be described in detail with reference to the drawings.

First, the steps of recording absence information in accordance with the principles of the present invention will be described with reference to FIGS. 3A and 3B.

In step 310, controller 110 determines whether or not the absence information recording key is input from operating panel (OPE) 116. Once the absence information recording key is input, controller 110 establishes an absence information recording mode, in step 312. Then, in step 314, controller 110 determines whether or not a destination is input from operating panel (OPE) 116. In particular, controller 110 determines whether or not a number corresponding to the area code of the destination is input from operating panel (OPE) 116. When the number corresponding to the area code of the destination is input, this data is recorded in area 512 of memory 120 shown in FIG. 5, in step 316.

In step 318, controller 110 determines whether or not respective number keys corresponding to telephone and facsimile numbers of the destination, and pager and cellular telephone numbers are input from operating panel (OPE) 116. When input, these numbers are recorded in area 514 of memory 120, in step 320.

In step 322, controller 110 determines whether or not the outgoing time represented as a date (year-month-day) and a time (hour-minute) is input from operating panel (OPE) 116. When input, the outgoing time is recorded in area 516 of memory 120, in step 324. Then, in step 326, controller 110 determines whether or not the expected return time represented as a date (year-month-day) and a time (hour-minute) is input from operating panel (OPE) 116. When input, the expected return time is recorded in area 518 of memory 120, in step 328. Controller 110 then determines whether or not the absence information recording end key is input from operating panel (OPE) 116, in step 330. When the absence information recording end key is input, controller 110 establishes a reception stand-by mode, in step 332. Alternatively, if the absence information recording end key is not input, controller 110 proceeds back to step 314.

Next, the steps of transmitting and changing absence information in accordance with the principles of the present invention will now be described with reference to FIGS. 4A and 4B.

In step 410, controller 110 determines whether or not the CNG signal is received from a transmitting party's facsimile system through network control unit (NCU) 112. Step 410 is similar to the protocol of FIGS. 6A and 6B when the reception of the CNG signal is carried out.

When the CNG signal is received, controller 110 forms a transmission loop in step 412 by sending the CED signal to the transmitting party's facsimile system. Then, in step 414, controller 110 determines whether or not an absence information transmission mode is established. The absence information transmission mode is set by inputting a predetermined key on operating panel (OPE) 116. If the absence information transmission mode is not established, controller 110 proceeds to step 436 and performs a corresponding function. Alternatively, if the absence information transmission mode is established, controller 110 transmits to the transmitting party's facsimile system, the NSF signal containing the absence information in its information area, as indicated in FIG. 7A. Step 416 is carried out as indicated by reference number 610 in the protocol of FIGS. 6A and 6B.

The following description describes the steps of transmitting the absence information that is stored as shown in FIG. 5.

The absence information stored in the information areas is as follows: φA053 φB 01 4602775 02 4602776 03 0127231234 04 0117114321 φC 9506161030 φD 9506171750 00, wherein the underlined φA, φB, φC and φD correspond to what are recorded in area 510 of FIG. 5, and 01, 02, 03 and +b 04 correspond to telephone and facsimile numbers at the recipient's destination, the pager number, and the cellular telephone number, respectively. +b 00 is indicative of the end of the absence information.

After transmission of the absence information in step 416, controller 110 detects reception of data received in response to transmission of the absence information. In other words, controller 110 determines whether changed (i.e., new) absence information to replace the previously recorded absence information is received in step 418. When the new absence information is not received, controller 110 detects whether or not reception error information reporting the occurrence or non-occurrence of an information reception error is received in step 420. If the reception error information is not received in step 420, controller 110 proceeds to step 424 and determines whether or not the protocol signals "(NSS)+CSI+DIS" for normal document transmission and reception are received. If received, the corresponding function is performed in step 436. Namely, facsimile messages are received from the transmitting party's facsimile system and printed via printer 122. Steps 418, 420 and 424 correspond to step 612 of FIGS. 6A and 6B.

When reception error information is received in step 420, controller 110 determines whether or not any reception error is generated in step 422 by analyzing the reception error information. That is, controller 110 analyzes the reception error information contained in the information area of the NSC or NSS signal, and determines if the reception error occurs according to the analyzed information. The information for determining an occurrence or non-occurrence of a reception error is represented as "00" to indicate normal reception of recipient absence information, and is alternatively represented as "01" to indicate the occurrence of a reception error.

When a "01" is detected in the information area of the NSC or NSS signal in step 422, controller 110 proceeds to step 416 and retransmits to the transmitting party's facsimile system, the NSC signal containing the absence information in the information area according to the protocol of FIG. 6B. Controller 110 repeatedly performs steps 420 and 422 until reception error information indicating normal reception of the absence information is received from the transmitting party's facsimile system. When a "00" is detected in the information area of the NSC or NSS signal in step 422, controller 110 proceeds to step 432 and transmits the DCN signal to the transmitting party's facsimile system according to the protocol of FIG. 6A. Then, in step 434, controller 110 disconnects the transmission loop, and the process ends.

The transmitting party's facsimile system receives the absence information and prints a recipient absence information list, as shown in FIG. 9.

When new absence information is received in step 418 to replace the previously recorded absence information, controller 110 performs steps for changing the absence information. The steps for recording the new, changed absence information at the transmitting party's facsimile system are the same as the steps for recording the absence information at the receiving party's facsimile system, as previously described. Accordingly, a detailed description of these steps will be omitted for the sake of brevity.

Steps for detecting the reception of new, changed absence information are described as follows.

Controller 110 analyzes the information contained in the information area of the NSC or NSS signal received as indicated by reference number 710 in the protocol shown in FIGS. 7A and 7B, and determines if the analyzed information contains new absence information.

Steps for transmitting the new absence information from the transmitting party's facsimile system will be evident to those skilled in the pertinent art from the steps for transmitting the absence information at the receiving party's facsimile system, and the detailed description thereof is omitted for the sake of brevity.

When new absence information is received in step 418, controller 110 analyzes the new absence information, and records the new absence information in the format shown in FIG. 5 to thereby replace the previously recorded absence information. In step 428, controller 110 determines if any reception error is generated from the new absence information. If a reception error is generated, controller 110 transmits reception error information reporting the occurrence of the reception error in step 430. The operation resulting from the generation of the reception error is performed according to the protocol of FIG. 7B, and step 430 in which the reception error information is transmitted is performed as indicated by reference number 712 of FIG. 7B. The NSC or NSS signal transmitted as indicated by reference number 712 employs the frame structure of FIG. 8B, and contains "01" in the information area to indicate the occurrence of a reception error. After performing step 430, controller 110 returns to step 418 to determine if the new absence information is received again. Controller 110 repeats steps 418, 426, 428 and 430 until the new absence information is normally received from the transmitting party's facsimile system.

When controller 110 does not detect any reception error in step 428, it transmits the DCN signal according to the protocol of FIG. 7A, in step 432. Controller 110 then disconnects the transmission loop, in step 434.

When controller 110 receives a call signal asking for document transmission after the absence information has been changed, controller 110 of the receiving party's facsimile system transmits the new, changed absence information. The transmitting party's facsimile system that receives the new absence information prints out the new absence information list, as shown in FIG. 10.

According to the present invention, if a calling party calls a recipient who is out after the recipient's absence information is recorded in his or her facsimile system, the recipient's facsimile system provides the calling party with the absence information, including such items as the recipient's destination, available telephone numbers at the destination, the recipient's outgoing time and the recipient's expected return time. The present invention also enables the absence information to be delivered in an accurate and timely manner, and enhances the performance of the info-communication medium. Moreover, the present invention has advantages in that the recipient is able to change the absence information from wherever he or she is. As a result, business can be carried on without any time loss or interference.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for recording and transmitting absence information in a facsimile system, comprising the steps of:

establishing an absence information recording mode in response to input of a first predetermined key and recording said absence information while said absence information recording mode is established, said absence information comprising a destination, telephone numbers at said destination, an outgoing time and an expected return time;

establishing an absence information transmission mode in response to input of a second predetermined key and transmitting said absence information upon receipt of a call signal while said absence information transmission mode is established;

re-transmitting said absence information until reception error information received in response to the transmission of said absence information indicates that a reception error has not occurred; and replacing said absence information with new absence information when said new absence information is received in response to the transmission of said absence information.

2. The method as claimed in claim 1, wherein said step of recording said absence information comprises the steps of:

recording said destination in reponse to an input representative of said destination;

recording said telephone numbers at said destination, after completing the recording of said destination;

recording said outgoing time, after completing the recording of the telephone numbers at said destination; and recording said expected return time, after completing the recording of said outgoing time.

3. The method as claimed in claim 2, wherein said input representative of said destination comprises an area code corresponding to said destination.

4. The method as claimed in claim 2, wherein said telephone numbers at said destination comprise a telephone number and a facsimile number.

5. The method as claimed in claim 3, wherein said telephone numbers at said destination comprise a telephone number and a facsimile number.

6. The method as claimed in claim 2, wherein said telephone numbers at said destination comprise a telephone number, a facsimile number, a pager number and a cellular number.

7. The method as claimed in claim 3, wherein said telephone numbers at said destination comprise a telephone number, a facsimile number, a pager number and a cellular number.

8. A method for recording absence information in a facsimile system, comprising the steps of:

establishing an absence information recording mode in said facsimile system in response to input of a first predetermined key on a keypad borne by said facsimile system;

recording said absence information comprising a destination sited at a second location different from said first location telephone numbers at said destination, an outgoing time and an expected return time in response to inputs during said absence information mode, said absence information being recorded for subsequent transmission to a remote facsimile system of a calling subscriber in a printable format to inform the calling subscriber of an absence of an intended recipient; and terminating said absence information recording mode and establishing a reception stand-by mode in response to input of a second predetermined key after said absence information is recorded during said absence information recording mode.

9. The method as claimed in claim 8, wherein said telephone numbers at said destination comprise a telephone number and a facsimile number.

10. The method as claimed in claim 8, wherein said telephone numbers at said destination comprise a telephone number, a facsimile number, a pager number and a cellular number.

11. A method for transmitting absence information in a facsimile system, comprising the steps of:

establishing a transmission loop in response to receipt of a call signal;

transmitting said absence information when said facsimile system is set to an absence information transmission mode, said absence information comprising a destination, telephone numbers at said destination, an outgoing time and an expected return time;

re-transmitting said absence information until reception error information received in response to the transmission of said absence information indicates that a reception error has not occurred; and replacing said absence information with new absence information when said new absence information is received in response to the transmission of said absence information.

12. The method as claimed in claim 11, wherein said telephone numbers at said destination comprise a telephone number and a facsimile number.

13. The method as claimed in claim 11, wherein said telephone numbers at said destination comprise a telephone number, a facsimile number, a pager number and a cellular number.

14. A facsimile system, comprising:

an operating panel having a plurality of keys for providing key inputs;

a memory for storing, in response to the key inputs from said operating panel, absence information comprising a destination, telephone numbers at said destination, an outgoing time and an expected return time; and a controller for enabling transmission of said absence information stored in said memory when said facsimile system is set to an absence information transmission mode and a call signal is received, said controller enabling re-transmission of said absence information until reception error information received in response to the transmission of said absence information indicates that a reception error has not occurred and replacing said absence information in said memory with new absence information when said new absence information is received in response to the transmission of said absence information.

15. The facsimile system as claimed in claim 14, wherein said telephone numbers at said destination comprise a telephone number and a facsimile number.

16. The facsimile system as claimed in claim 14, wherein said telephone numbers at said destination comprise a telephone number, a facsimile number, a pager number and a cellular number.

17. The method as claimed in claim 8, further comprising the steps of:

establishing an absence information transmission mode in response to input of a third predetermined key; and transmitting said absence information to a remote facsimile system upon receipt of a call signal from said remote facsimile system via a telephone network, when said absence information transmission mode is established.

18. The method as claimed in claim 17, further comprising the steps of:

re-transmitting said absence information until reception error information received in response to the transmission of said absence information indicates that a reception error has not occurred; and replacing said absence information with new absence information, when said new absence information is received in response to the transmission of said absence information.

19. The facsimile system as claimed in claim 14, further comprised of said controller establishing an absence information recording mode in response to input of a first predetermined key, recording said absence information in said memory in response to the key inputs from said operating panel when an absence information recording mode is established, and terminating said absence information recording mode and concomitantly establishing a reception stand-by mode in response to input of a second predetermined key after said absence information is recorded in said memory.

20. The facsimile system as claimed in claim 19, further comprised of said telephone numbers at said destination comprising a telephone number, a facsimile number, a pager number and a cellular number.

* * * * *